US007330653B1

(12) United States Patent
Roberts et al.

(10) Patent No.: US 7,330,653 B1
(45) Date of Patent: Feb. 12, 2008

(54) QUANTUM DENSE CODING SYSTEM

(75) Inventors: Mark W. Roberts, San Diego, CA (US); Markham E. Lasher, La Jolla, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 526 days.

(21) Appl. No.: 10/989,139

(22) Filed: Nov. 15, 2004

(51) Int. Cl.
*H04B 10/00* (2006.01)
*H04K 1/00* (2006.01)

(52) U.S. Cl. .................. 398/40; 398/39; 398/140; 398/152; 380/255; 380/256; 380/277; 380/44; 356/450

(58) Field of Classification Search ............. 398/39, 398/40, 152, 158, 183, 184, 192, 202, 208, 398/140; 380/44, 256, 260, 277–283, 255; 359/108, 330; 372/21, 102; 356/450
See application file for complete search history.

(56) References Cited

U.S. PATENT DOCUMENTS

| | | | |
|---|---|---|---|
| 5,339,182 A * | 8/1994 | Kimble et al. | 398/158 |
| 6,424,665 B1 * | 7/2002 | Kwiat et al. | 372/21 |
| 6,678,054 B1 * | 1/2004 | Dress et al. | 356/450 |
| 6,982,822 B2 * | 1/2006 | Teich et al. | 359/330 |
| 7,126,691 B2 * | 10/2006 | Gat | 356/450 |
| 2001/0055389 A1 * | 12/2001 | Hughes et al. | 380/44 |
| 2003/0086138 A1 * | 5/2003 | Pittman et al. | 359/108 |
| 2003/0123516 A1 * | 7/2003 | Steinberg et al. | 372/102 |
| 2004/0151321 A1 * | 8/2004 | Lutkenhaus | 380/278 |

OTHER PUBLICATIONS

Mattle et al: "Dense Coding in Experimental Quantum Communication", Physcial Review Letters, vol. 76, No. 25, Jun. 17, 1996, pp. 4656-4659.*
Li et al: "Quantum Dense Coding Exploiting a Bright Einstein-Podolsky-Rosen Beam", Physcial Review Letters, vol. 88, No. 4, Jan. 28, 2002, pp. 047904-1 to 047904-4.*
Weinfurter et al: "Quantum Communication and Entanglement", ISCAS 2000, May 28-31, 2000, Geneva, pp. II-236 to II-239.*

* cited by examiner

*Primary Examiner*—Kenneth Vanderpuye
*Assistant Examiner*—Li Liu
(74) *Attorney, Agent, or Firm*—Peter A. Lipovsky; Allan Y. Lee; J. Eric Anderson

(57) ABSTRACT

A Quantum Dense Coding System. The system includes a source, a transmitter and a receiver. The source is capable of down-converting a pump photon into a signal photon and an idler photon and outputting probability amplitudes, the signal photon and the idler photon, wherein the signal photon and the idler photon have an equal probability of outputting to a transmission channel and a reception channel. The transmitter is capable of receiving probability amplitudes, signal photons and idler photons from the transmission channel; and selectively changing vertical and horizontal phases of probability amplitudes of signal photons and idler photons; and outputting probability amplitudes, signal photons and idler photons. The receiver is capable of receiving probability amplitudes, signal photons and idler photons from the reception channel and the transmitter; and identifying vertical and horizontal phase changes created by the transmitter. A method for the system is also described.

20 Claims, 2 Drawing Sheets

QUANTUM DENSE CODING SYSTEM

BACKGROUND OF THE INVENTION

The present invention is generally in the field of optical communication systems.

Typical optical communication systems are susceptible to interception and detection. In addition, typical optical communication systems are inefficient (e.g., can transmit, at most, only one bit of information per transmitted photon).

A need exists for optical communication systems having low probability of interception (LPI), low probability of detection (LPD) and increased efficiency.

DETAILED DESCRIPTION OF THE INVENTION

The present invention is directed to Quantum Dense Coding Systems (QDCS). Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

DEFINITIONS

The following definitions and acronyms are used herein:

Acronym(s):
LPI—Low Probability of Interception
LPD—Low Probability of Detection
PA—Probability Amplitude(s)
QDC—Quantum Dense Coding
QDCS—Quantum Dense Coding System
SRC—Source
TX—Transmitter
RX—Receiver
L—Continuous Wave Laser
NLC—Nonlinear Crystal
WSM—Wavelength Selective Mirror
STP—Beamstop
ABS1—First 50/50 Amplitude Beam Splitter
ABS2—Second 50/50 Amplitude Beam Splitter
P—Pump Photons
S—Signal Photons
I—Idler Photons
V—Vertical
H—Horizontal
TPBS1—First Transmitter Polarizing Beam Splitter
TPBS2—Second Transmitter Polarizing Beam Splitter
HWP—Horizontal Phase Controller
VWP—Vertical Phase Controller
M—Mirror
EO—Electro Optic
CC—Corner Reflector
RPBS1—First Receiver Polarizing Beam Splitter
RPBS2-Second Receiver Polarizing Beam Splitter Definition(s):

Probability Amplitude—a Complex Wave Function.

The quantum dense coding (QDC) system is capable of transmitting, on average, two bits of information per transmitted photon using vertical and horizontal phase shifts of the probability amplitudes of signal photons and idler photons. The QDC system includes an interferometer having a vertical phase controller and a horizontal phase controller. In one embodiment, the QDC system includes a pseudo-Mach-Zehnder interferometer. Those skilled in the art shall recognize that the QDC system can include other interferometers, such as, for example, a Michelson interferometer without departing from the scope or spirit of the QDC system. In one embodiment, the QDC system has LPI and LPD. In one embodiment, the QDC system has high efficiency.

Figure 1:
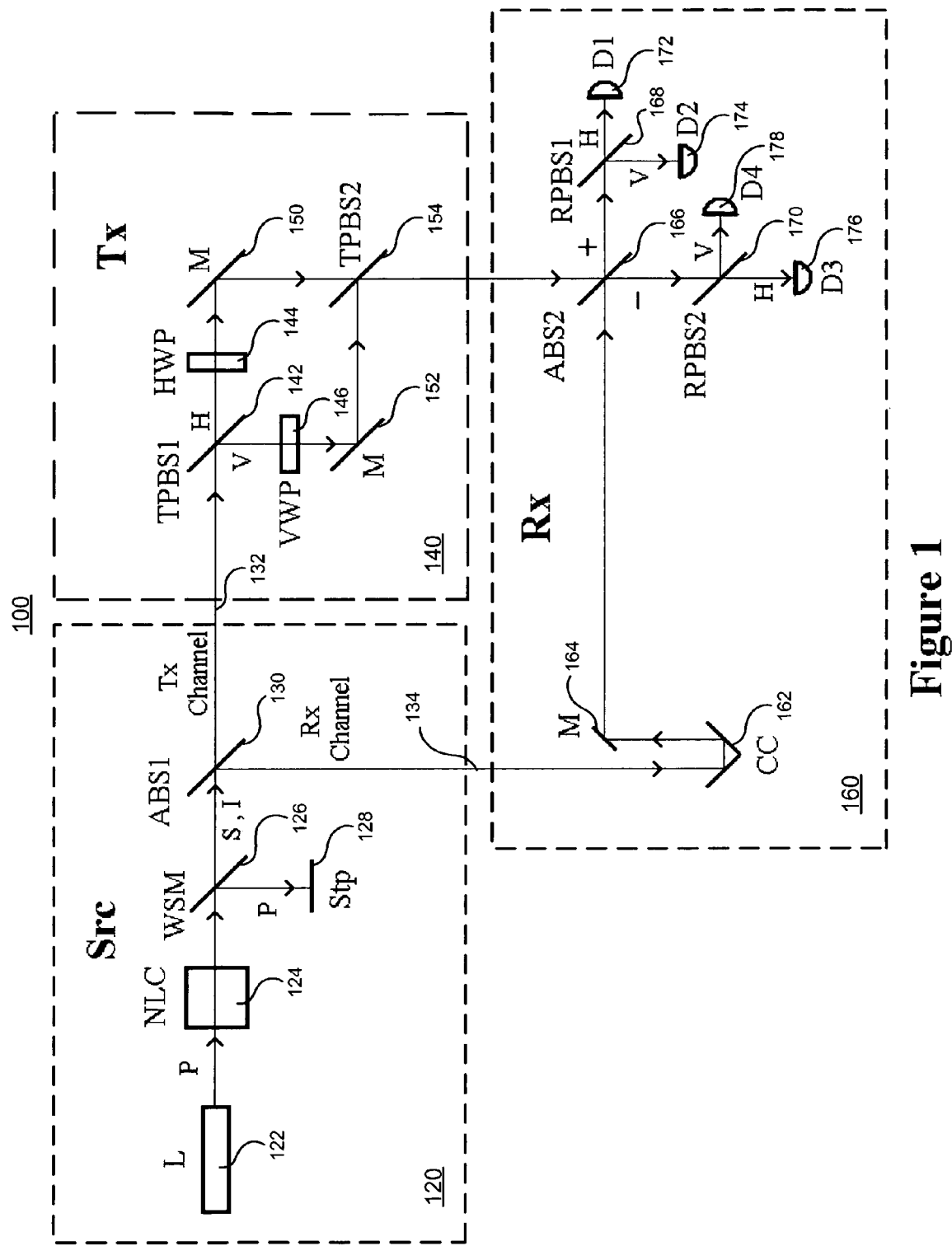
FIG. 1 is a block diagram of one embodiment of a QDC system.

FIG. 1 is a block diagram of one embodiment of a QDC system. As shown in FIG. 1, QDCS 100 includes source (SRC) 120, transmitter (TX) 140 and receiver (RX) 160. SRC 120, TX 140 and RX 160 can be collocated or non-collocated. In one embodiment, SRC 120 and RX 160 are collocated.

Source 120 down-converts pump photons into signal and idler photons, time separates signal and idler photons and outputs signal photons and idler photons and their probability amplitudes. SRC 120 includes continuous wave laser (L) 122, nonlinear crystal (NLC) 124, wavelength selective mirror (WSM) 126, beamstop (STP) 128 and first 50/50 amplitude beam splitter (ABS1) 130. Continuous wave laser 122 outputs pump (P) photons. Nonlinear crystal 124 receives pump photons from L 122 and parametrically down-converts a pump photon into a signal (S) photon and an idler (I) photon, which have the same frequency. In one embodiment, NLC 124 comprises a configuration capable of down-converting via collinear, degenerate, type II phase matching. In one embodiment, NLC 124 comprises beta barium borate. Those skilled in the art shall recognize that NLC 124 can comprise other material, such as, for example, lithium niobate and potassium dihydrogen phosphate without departing from the scope or spirit of the QDCS 100. In one embodiment, NLC 124 comprises a configuration capable of down-converting via non-collinear, type I or type II phase matching. For type II phase matching, S photons exit NLC 124 vertically polarized and I photons exit NLC 124 horizontally polarized. S and I photons are time separated by a predetermined time delay, which prevents overlap between S and I photons in QDCS 100. In addition, the predetermined time delay prevents fourth-order interference in QDCS 100. In one embodiment, the predetermined time delay is approximately equal to 100 femtoseconds. In one embodiment, the predetermined time delay is achieved through group velocity differences in NLC 124, thickness of NLC 124 and system bandwidth. NLC 124 outputs P, S and I photons.

Wavelength selective mirror 126 of SRC 120 receives P, S and I photons from NLC 124. WSM 126 reflects P photons (i.e., pump photons that were not down-converted by NLC 124) to beamstop 128. STP 128 receives and discards P photons. WSM 126 transmits S and I photons. First 50/50 amplitude beam splitter 130 receives S and I photons from WSM 126. S and I photons have an equal probability of transmitting to a transmitter channel or reflecting to a receiver channel. ABS1 130 outputs equal probability amplitudes to both the transmitter channel and the receiver channel. ABS1 130 outputs PA, S photons and I photons to the transmitter and receiver channels.

Transmitter 140 receives probability amplitudes, S photons and I photons via the transmitter channel, selectively changes vertical (V) and horizontal (H) phases of the probability amplitudes of S photons and I photons and outputs probability amplitudes, S photons and I photons. Transmitter 140 transmits two bits of information corresponding to four messages: +H+V, −H+V, +H−V and −H−V. Transmitter 140 includes first transmitter polarizing beam splitter (TPBS1) 142, horizontal phase controller (HWP) 144, vertical phase controller (VWP) 146, mirrors 150, 152 and second transmitter polarizing beam splitter (TPBS2) 154. First transmitter polarizing beam splitter receives PA, S photons and I photons from ABS1 130 of SRC 120 via the transmission channel.

TPBS1 142 of TX 140 transmits I photons (due to their horizontal polarization) and PA having horizontal polarization (i.e., PA associated with I photons). Horizontal phase controller 144 receives I photons and PA having horizontal polarization. HWP 144 is capable of selectively changing the phase of I photons and PA having horizontal polarization. In one embodiment, HWP 144 selectively changes the phase of I photons and PA having horizontal polarization by zero degrees or 180 degrees. In one embodiment, HWP 144 comprises a half-wave plate. In one embodiment, HWP 144 comprises an optical wave plate. In one embodiment, HWP 144 comprises an optical phase-controlling device. In one embodiment, HWP 144 comprises an electro optic (EO) modulator. In one embodiment, HWP 144 selectively changes the phase of I photons and PA having horizontal polarization by either setting a fast axis of HWP 144 horizontally or setting a slow axis of HWP 144 horizontally. Setting the fast axis of HWP 144 horizontally corresponds to transmitting a +H. Setting the slow axis of HWP 144 horizontally corresponds to transmitting a −H. HWP 144 outputs I photons and PA having horizontal polarization. Mirror 150 receives and reflects I photons and PA. M 150 outputs I photons and PA.

TPBS1 142 of TX 140 reflects S photons (due to their vertical polarization) and PA having vertical polarization (i.e., PA associated with S photons). Vertical phase controller 146 receives S photons and PA having vertical polarization. VWP 146 is capable of selectively changing the phase of S photons and PA having vertical polarization. In one embodiment, VWP 146 selectively changes the phase of S photons and PA having vertical polarization by zero degrees or 180 degrees. In one embodiment, VWP 146 comprises a half-wave plate. In one embodiment, VWP 146 comprises an optical wave plate. In one embodiment, VWP 146 comprises an optical phase-controlling device. In one embodiment, VWP 146 comprises an EO modulator. In one embodiment, VWP 146 selectively changes the phase of S photons and PA having vertical polarization by either setting a fast axis of VWP 146 vertically or setting a slow axis of VWP 146 vertically. Setting the fast axis of VWP 146 vertically corresponds to transmitting a +V. Setting the slow axis of VWP 146 vertically corresponds to transmitting a −V. VWP 146 outputs S photons and PA having vertical polarization. Mirror 152 receives and reflects S photons and PA. M 152 outputs S photons and PA.

Second transmitter polarizing beam splitter 154 receives PA, S photons and I photons from M 152 and M 150. TPBS2 154 transmits I photons and PA from M 150 and reflects S photons and PA from M 152. Thus, TPBS2 154 outputs PA, S photons and I photons in a single output channel.

Receiver 160 receives PA, S photons and I photons via the receiver channel and from TX 140. RX 160 is capable of identifying vertical and horizontal phase changes introduced by TX 140. Thus, RX 160 is capable of receiving two bits of information per two photons. RX 160 is capable of identifying two bits of information, which correspond to four messages: +H+V, −H+V, +H−V and −H−V. RX 160 includes corner reflector (CC) 162, mirror 164, second 50/50 amplitude beam splitter (ABS2) 166, first receiver polarizing beam splitter (RPBS1) 168, second receiver polarizing beam splitter (RPBS2) 170, first detector (D1) 172, second detector (D2) 174, third detector (D3) 176 and fourth detector (D4) 178. Corner reflector 162 receives PA, S photons and I photons from ABS1 130 of SRC 120 via the receiver channel. CC 162 reflects and outputs PA, S photons and I photons to M 164. CC 162 provides a means to adjust the optical path length between ABS1 130 and ABS2 166 in the RX channel to equal the optical path length between ABS1 130 and ABS2 166 in the TX channel. Those of ordinary skill in the art shall recognize that QDCS 100 can use other means to adjust the optical path length, such as spooled optical cable, without departing from the scope or spirit of the QDCS 100. M 164 reflects PA, S photons and I photons to ABS2 166.

ABS2 166, RPBS1 168 and RPBS2 170 transmit and/or reflect PA, S photons and I photons to detectors 172, 174, 176, 178 depending on the vertical and horizontal phases of PA, S photons and I photons. ABS2 166 receives PA, S photons and I photons from M 164 and TPBS2 154 of TX 140 and recombines H phase amplitudes and V phase amplitudes. ABS2 outputs S photons and I photons that have recombined V phase amplitudes and N phase amplitudes in phase to a plus (+) channel. ABS2 166 outputs S photons and I photons that have recombined V phase amplitudes and H phase amplitudes out of phase to a minus (−) channel.

First receiver polarizing beam splitter (RPBS1) 168 receives S photons and I photons from ABS2 166 via the plus channel. RPBS1 168 transmits horizontally polarized photons to first detector (D1) 172. RPBS1 168 reflects vertically polarized photons to second detector (D2) 174. D1 172 and D2 174 are capable of photon counting.

Second receiver polarizing beam splitter (RPBS2) 170 receives S photons and I photons from ABS2 166 via the minus channel. RPBS2 170 transmits horizontally polarized photons to third detector (D3) 176. RPBS2 170 reflects vertically polarized photons to fourth detector (D4) 178. D3 176 and D4 178 are capable of photon counting.

The electronic outputs of detectors D1 172, D2 174, D3 176 and D4 178 can be interconnected using electronic circuitry (not shown in FIG. 1) that will allow coincidence detection of each signal and idler pair of photons. Coincidence detection of the photon pairs provides a large increase in the signal-to-noise ratio of the QDCS.

QDC system 100 is capable of transmitting and receiving one of four distinct messages per two photons (S photon and I photon). QDC system 100 does not provide any welcher weg (i.e., which path) information because photon detection occurs subsequent to photons outputting from ABS2 166. One embodiment of QDC system 100 is now described. A first message, +H+V, transmits to receiver 160 by setting a fast axis of HWP 144 of TX 140 horizontally and a fast axis of VWP 146 of TX 140 vertically. Receiver 160 identifies the first message when D1 172 and D2 174 receive photons, which indicates +H+V. A second message, −H+V, transmits to receiver 160 by setting a slow axis of HWP 144 of TX 140 horizontally and a fast axis of VWP 146 of TX 140 vertically. Receiver 160 identifies the second message when D3 176 and D2 174 receive photons, which indicates −H+V. A third message, +H−V, transmits to receiver 160 by setting a fast axis of HWP 144 of TX 140 horizontally and a slow axis of VWP 146 of TX 140 vertically. Receiver 160 identifies the third message when D1 172 and D4 178 receive photons, which indicates +H−V. A fourth message, −H−V, transmits to receiver 160 by setting a slow axis of HWP 144 of TX 140 horizontally and a slow axis of VWP 146 of TX 140 vertically. Receiver 160 identifies the third message when D3 176 and D4 178 receive photons, which indicates −H−V.

Table A comprises the a priori probabilities associated with QDCS 100. On average, one photon of each down-converted photon pair outputs to the transmitter channel and travels from SRC 120 to TX 140 to RX 160; and one photon of each down-converted photon pair outputs to the receiver channel and travels from SRC 120 to RX 160. Each photon pair received by RX 160 carries two bits of information from TX 140 to RX 160. Thus, QDCS 100, on average, transmits two bits of information for every single frequency photon that travels from TX 140 to RX 160.

TABLE A

| Probability | TX Channel | RX Channel | Information |
|---|---|---|---|
| 25% | H photon | V photon | 2 bits |
| 25% | V photon | H photon | 2 bits |
| 25% | H and V photons | No photon | 2 bits |
| 25% | No photon | H and V photons | 2 bits |

Figure 2:
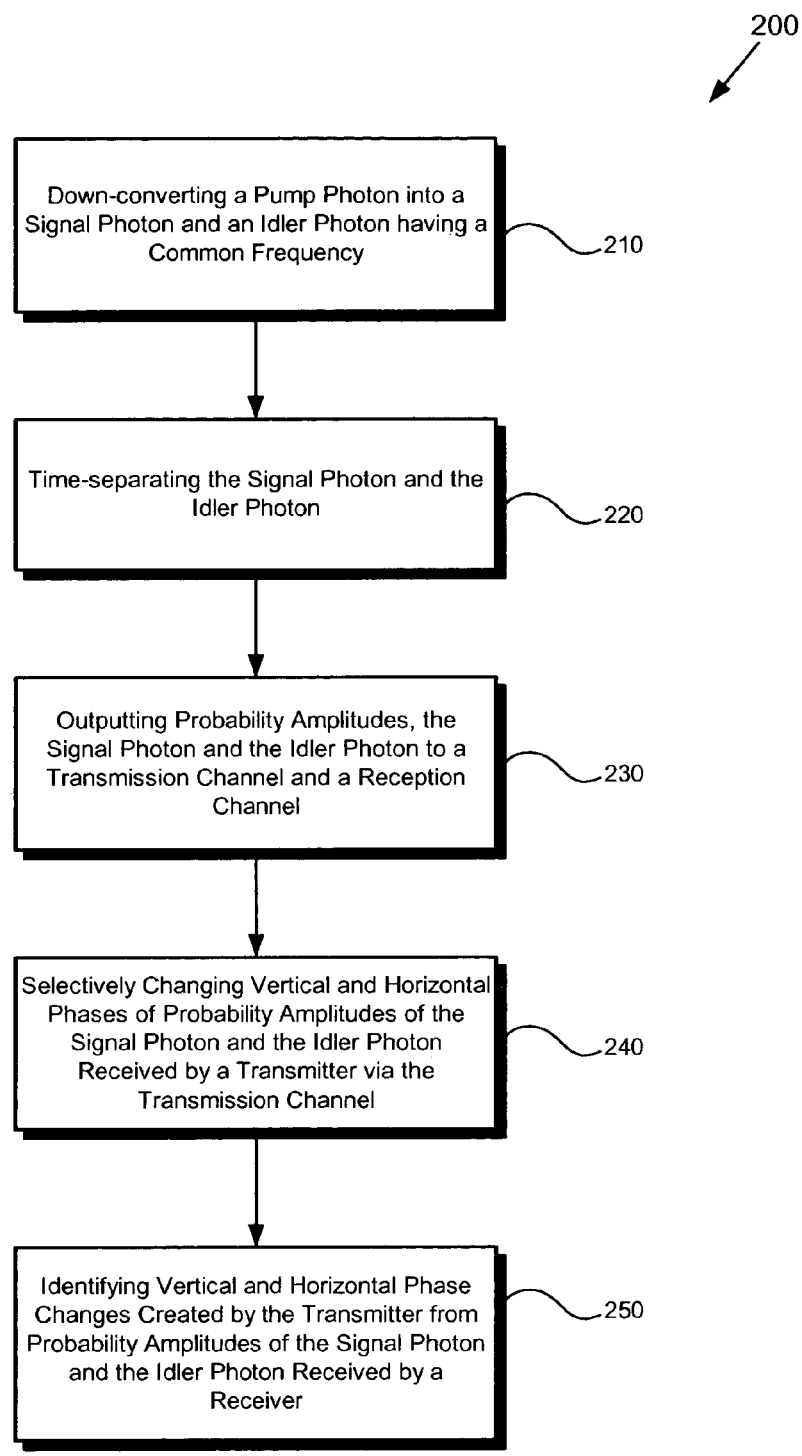
FIG. 2 is a flowchart of an exemplary method of one embodiment of a QDC system.

FIG. 2 is a flowchart illustrating exemplary process steps taken to implement an exemplary QDCS. Certain details and features have been left out of flowchart 200 of FIG. 2 that are apparent to a person of ordinary skill in the art. For example, a step may consist of one or more sub-steps or may involve specialized equipment or materials, as known in the art. While STEPS 210 through 250 shown in flowchart 200 are sufficient to describe one embodiment of the QDCS, other embodiments of the QDCS may utilize steps different from those shown in flowchart 200.

Referring to FIG. 2, at STEP 210 in flowchart 200, the method down-converts a pump photon into a signal photon and an idler photon having a common frequency. In one embodiment, the method down-converts pump photons using a continuous wave laser that outputs pump photons to a nonlinear crystal. After STEP 210, the method proceeds to STEP STEP 220 in flowchart 200, the method time-separates the signal photon and the idler photon so they do not overlap in QDCS. In one embodiment, the method causes a time delay between the signal photon and the idler photon via system bandwidth, NLC thickness and group velocity differences. After STEP 220, the method proceeds to STEP 230. At STEP 230 in flowchart 200, the method outputs PA, the signal photon and the idler photon to a transmission channel and a reception channel, wherein the signal photon and the idler photon have equal probabilities of outputting to the transmission channel and the reception channel. In one embodiment, the method transmits PA, signal photons and idler photons through a 50/50 amplitude beam splitter. After STEP 230, the method proceeds to STEP 240.

At STEP 240 in flowchart 200, the method selectively changes vertical and horizontal phases of probability amplitudes of the signal photon and the idler photon received by a transmitter via the transmission channel. In one embodiment, the method selectively changes vertical and horizontal phases using a vertical phase controller and a horizontal phase controller. After STEP 240, the method proceeds to STEP 250. At STEP 250 in flowchart 200, the method identifies vertical and horizontal phase changes created by the transmitter from PA, the signal photon and the idler photon received by a receiver via the reception channel and the transmitter. In one embodiment, the method identifies vertical and horizontal phase changes using a 50/50 amplitude beam splitter, polarizing beam splitters and photodetectors. In one embodiment, the method terminates at STEP 250. In one embodiment, the method returns to STEP 210 after STEP 250.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

We claim:

1. A Quantum Dense Coding System, comprising:
   a) a source, capable of down-converting a pump photon into a signal photon and an idler photon that have a common frequency, capable of time separating said signal photon and said idler photon so that said signal photon and said idler photon do not overlap in said QDCS, and capable of outputting probability amplitudes, said signal photon and said idler photon, wherein said signal photon and said idler photon have an equal probability of outputting to a transmission channel and a reception channel;
   b) a transmitter, operatively coupled to said source, capable of receiving probability amplitudes, signal photons and idler photons from said transmission channel, capable of selectively changing vertical and horizontal phases of probability amplitudes, signal photons and idler photons, and capable of outputting probability amplitudes, signal photons and idler photons;
   c) a receiver, operatively coupled to said transmitter and said source, capable of receiving probability amplitudes, signal photons and idler photons from said reception channel and said transmitter, and capable of identifying vertical and horizontal phase changes created by said transmitter.

2. The system of claim 1, wherein said source and said receiver are collocated, and wherein said source and said transmitter are not collocated.

3. The system of claim 1, wherein said transmitter is capable of transmitting two bits of information corresponding to four messages, wherein a first message comprises +H+V, a second message comprises −H+V, a third message comprises +H−V and a fourth message comprises −H−V.

4. The system of claim 1, wherein said transmitter is capable of selectively changing vertical and horizontal phases of probability amplitudes of signal photons and idler photons by zero degrees and 180 degrees.

5. The system of claim 1, wherein said source comprises:
   i) a continuous wave laser, capable of outputting pump photons;
   ii) a nonlinear crystal, operatively coupled to said continuous wave laser, capable of receiving and down-converting said pump photon into said signal photon and said idler photon;
   iii) a first 50/50 amplitude beam splitter, operatively coupled to said nonlinear crystal, capable of receiving said signal photon and said idler photon, capable of outputting probability amplitudes, said signal photon and said idler photon to said transmission channel and said reception channel, wherein said signal photon and said idler photon have an equal probability of outputting to said transmission channel and said reception channel.

6. The system of claim 5, wherein said source further comprises a wavelength selective mirror, operatively coupled to said nonlinear crystal and said first 50/50 amplitude beam splitter, capable of receiving said signal photon and said idler photon from said nonlinear crystal, capable of reflecting said pump photon into a beamstop, and capable of transmitting said signal photon and said idler photon to said first 50/50 amplitude beam splitter.

7. The system of claim 5, wherein said nonlinear crystal comprises a configuration capable of down-converting via non-collinear, type I or type II phase matching.

8. The system of claim 5, wherein said nonlinear crystal comprises a configuration capable of down-converting via collinear, degenerate, type II phase matching.

9. The system of claim 1, wherein said transmitter comprises:
   i) a first transmitter polarizing beam splitter, operatively coupled to said transmission channel, capable of receiving said probability amplitudes, said signal photon and said idler photon via said transmission channel, capable of transmitting said idler photon and said probability amplitudes having horizontal polarization, and capable of reflecting said signal photon and said probability amplitudes having vertical polarization;
   ii) a horizontal phase controller, operatively coupled to said first transmitter polarizing beam splitter, capable of receiving said idler photon and said probability amplitudes having horizontal polarization, capable of selectively changing a phase of said idler photon and said probability amplitudes having horizontal polarization, and capable of outputting said idler photon and said probability amplitudes having horizontal polarization;
   iii) a vertical phase controller, operatively coupled to said first transmitter polarizing beam splitter, capable of receiving said signal photon and said probability amplitudes having vertical polarization, capable of selectively changing a phase of said signal photon and said probability amplitudes having vertical polarization, and capable of outputting said signal photon and said probability amplitudes having vertical polarization;
   iv) a second transmitter polarizing beam splitter, operatively coupled to said horizontal phase controller and said vertical phase controller, capable of receiving said probability amplitudes, said signal photon and said idler photon, and capable of outputting said probability amplitudes, said signal photon and said idler photon to said receiver.

10. The system of claim 9, wherein said transmitter further comprises mirrors, operatively coupled to said vertical phase controller, said horizontal phase controller and said second transmitter polarizing beam splitter, capable of receiving and reflecting said probability amplitudes, said signal photon and said idler photon from said vertical phase controller and said horizontal phase controller to said second transmitter polarizing beam splitter.

11. The system of claim 9, wherein said horizontal phase controller selectively changes said phase of said idler photons and said probability amplitudes having horizontal polarization by setting a fast axis of said horizontal phase controller horizontally or setting a slow axis of said horizontal phase controller horizontally.

12. The system of claim 9, wherein said vertical phase controller selectively changes said phase of said signal photons and said probability amplitudes having vertical polarization by setting a fast axis of said vertical phase controller vertically or setting a slow axis of said vertical phase controller vertically.

13. The system of claim 1, wherein said receiver comprises:
   i) a second amplitude beam splitter, operatively coupled to said reception channel and said transmitter, capable of receiving said probability amplitudes, said signal photon and said idler photon via said reception channel and said transmitter, capable of recombining V phase amplitudes and H phase amplitudes of signal and idler photons, capable of transmitting signal and idler photons having recombined V phase amplitudes and H phase amplitudes in phase to a plus channel, and capable of reflecting signal and idler photons having recombined V phase amplitudes and H phase amplitudes out of phase to a minus channel;
   ii) a first receiver polarizing beam splitter, operatively coupled to said second amplitude beam splitter, capable of receiving said idler photon and said signal photon via said plus channel, capable of transmitting horizontally polarized photons to a first detector, and capable of reflecting vertically polarized photons to a second detector;
   iii) a second receiver polarizing beam splitter, operatively coupled to said second amplitude beam splitter, capable of receiving said idler photon and said signal photon via said minus channel, capable of transmitting horizontally polarized photons to a third detector, and capable of reflecting vertically polarized photons to a fourth detector.

14. The system of claim 13, wherein said receiver is capable of identifying two bits of information corresponding to four messages by determining when said first detector, said second detector, said third detector and said fourth detector receive photons.

15. A method for a Quantum Dense Coding System, the method comprising the steps of:
   a) down-converting a pump photon into a signal photon and an idler photon having a common frequency;
   b) time-separating said signal photon and said idler photon so said signal photon and said idler photon do not overlap in said quantum dense coding system;
   c) outputting probability amplitudes, said signal photon and said idler photon to a transmission channel and a reception channel, wherein said signal photon and said idler photon have an equal probability of outputting to said transmission channel and said reception channel;
   d) changing selectively vertical and horizontal phases of probability amplitudes of said signal photon and said idler photon received by a transmitter in said transmission channel;
   e) identifying vertical and horizontal phase changes created by said transmitter from probability amplitudes of said signal photon and said idler photon received in a receiver via said reception channel and said transmitter.

16. The method of claim 15, wherein said changing selectively STEP (d) uses a horizontal phase controller and a vertical phase controller.

17. The method of claim 15, wherein said method is capable of transmitting two bits of information corresponding to four messages, wherein a first message comprises +H+V, a second message comprises −H+V, a third message comprises +H−V and a fourth message comprises −H−V.

18. A Quantum Dense Coding System, comprising:
a) means for down-converting a pump photon into a signal photon and an idler photon having a common frequency;
b) means for time-separating said signal photon and said idler photon so said signal photon and said idler photon do not overlap in said quantum dense coding system;
c) means, operatively coupled to said means for down-converting a pump photon, for outputting probability amplitudes, said signal photon and said idler photon to a transmission channel and a reception channel, wherein said signal photon and said idler photon have an equal probability of outputting to said transmission channel and said reception channel;
d) means, operatively coupled to said means for outputting probability amplitudes, said signal photon and said idler photon to a transmission channel and a reception channel, for selectively changing vertical and horizontal phases of probability amplitudes of said signal photon and said idler photon received by a transmitter in said transmission channel;
e) means, operatively coupled to said means for outputting probability amplitudes, said signal photon and said idler photon to a transmission channel and a reception channel and said means for selectively changing vertical and horizontal phases of probability amplitudes of said signal photon and said idler photon, for identifying vertical and horizontal phase changes created by said transmitter from probability amplitudes of said signal photon and said idler photon received in a receiver via said reception channel and said transmitter.

19. The Quantum Dense Coding System of claim 18, wherein said means for selectively changing horizontal and vertical phases uses a horizontal phase controller and a vertical phase controller.

20. The Quantum Dense Coding System of claim 18, wherein said quantum dense coding system is capable of transmitting two bits of information corresponding to four messages, wherein a first message comprises +H+V, a second message comprises −H+V, a third message comprises +H−V and a fourth message comprises −H−V.

* * * * *